Aug. 4, 1970     O. MUSGRAVE     3,522,695
DEBRIS CATCHER
Filed Oct. 22, 1965     2 Sheets-Sheet 1
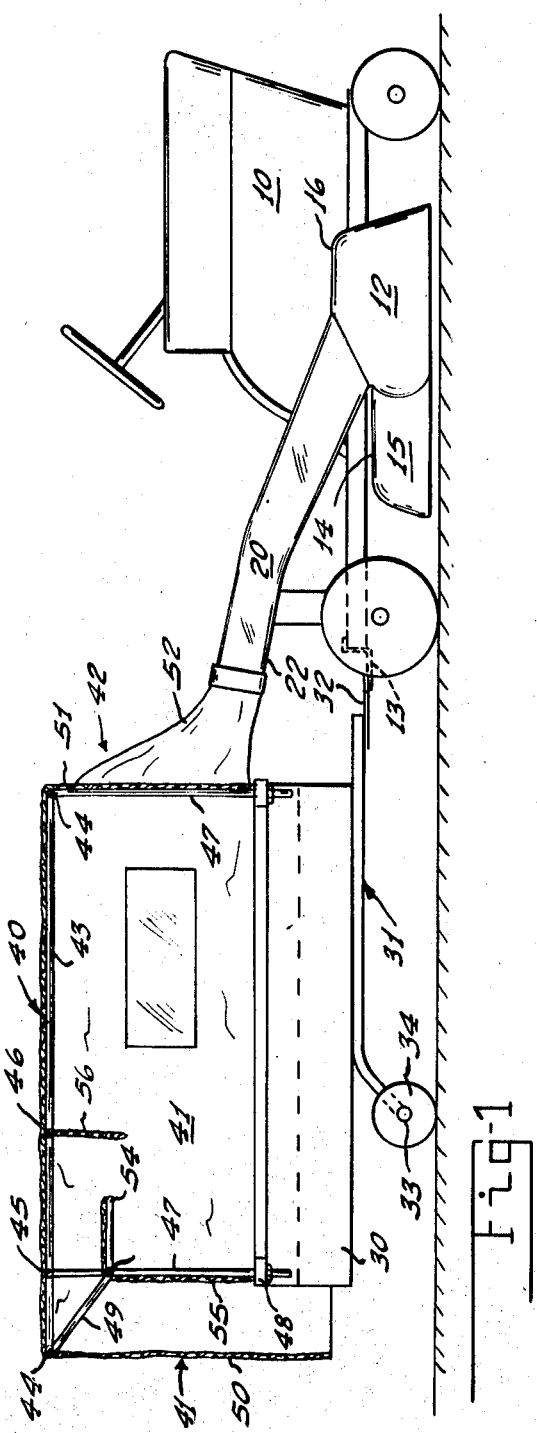
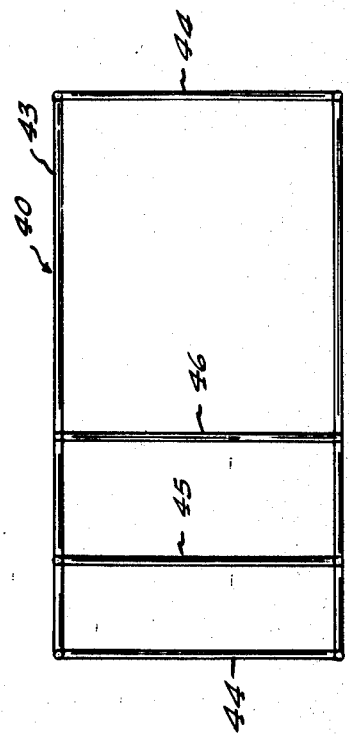
INVENTOR
ORLY MUSGRAVE
BY *Jerome P. Bloom*
ATTORNEY Aug. 4, 1970     O. MUSGRAVE     3,522,695
DEBRIS CATCHER
Filed Oct. 22, 1965     2 Sheets-Sheet 2
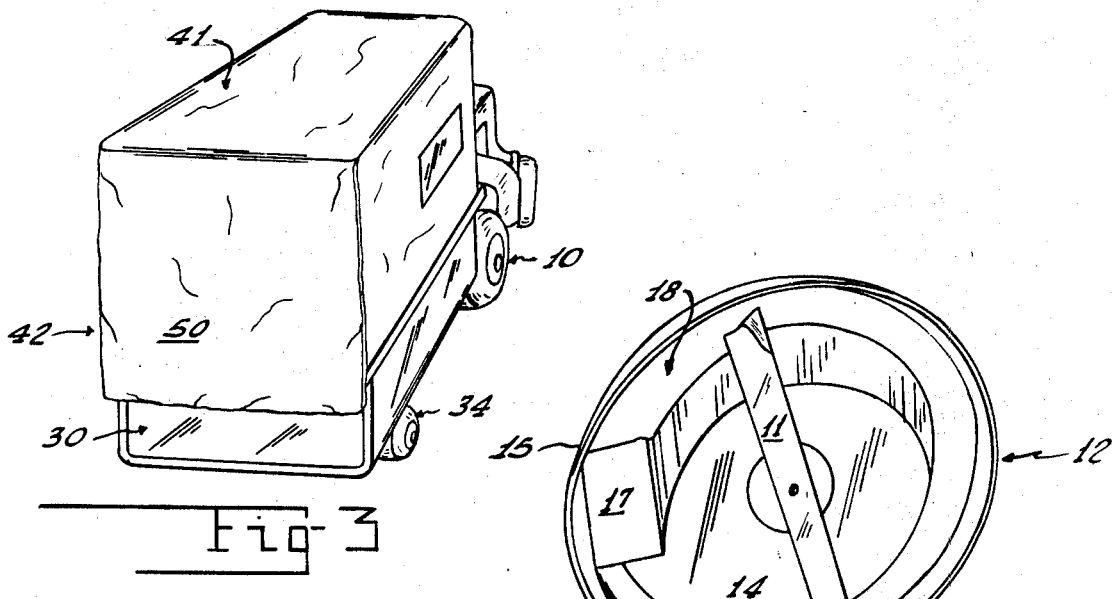
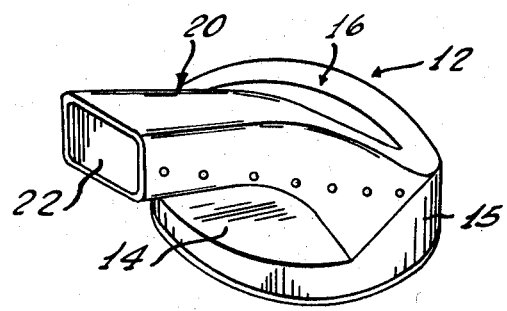
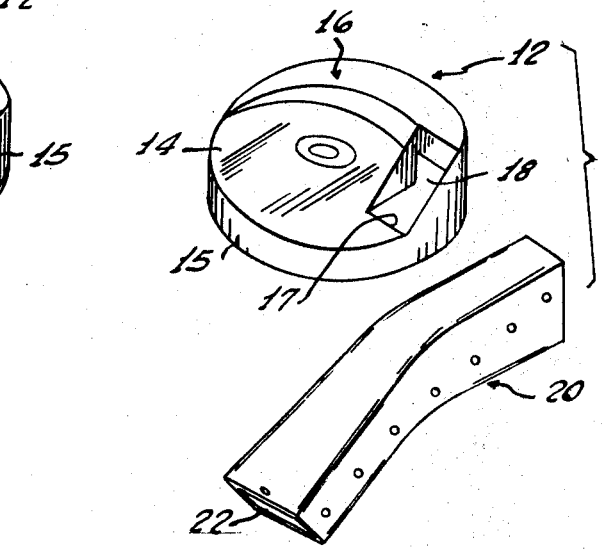
INVENTOR
ORLY MUSGRAVE
BY Jerome P. Bloom
ATTORNEY

United States Patent Office 3,522,695
Patented Aug. 4, 1970

3,522,695
DEBRIS CATCHER
Orly Musgrave, Springfield, Ohio, assignor to Mast-Foos Mfg. Co., Inc., Springfield, Ohio, a corporation of Ohio
Filed Oct. 22, 1965, Ser. No. 501,291
Int. Cl. A01d *35/26*
U.S. Cl. 56—25.4                             12 Claims This invention relates to a unique mobile unit for catching and storing thrown debris. Embodiments are quite versatile, both as to their form and application. They may be utilized in conjunction with a great variety of devices which, in the operation thereof, move over a ground surface to lift and discharge cuttings or other underlying debris. However, for purposes of illustration the disclosure of the invention will be limited to a preferred embodiment which is attached to a riding lawn mower through the medium of a novel deck structure. The latter is so designed to facilitate the movement of debris to the catcher and to thereby reduce the load on the mower.

A primary object of the invention is to provide apparatus for catching and storing thrown debris which is economical to fabricate, more efficient and satisfactory in use, adaptable to a wide variety of applications and unlikely to malfunction.

Another object of the invention is to provide apparatus as above described with means facilitating the flow of debris from the related throwing unit.

A further object of the invention is to provide a unique debris catcher for attachment to a lawn mower or like equipment.

An additional object of the invention is to provide a debris catcher of the class described including a mobile cart structure which inherently functions to create maximal storage facilities in a minimal space.

A further object of the invention is to produce a mobile unit for accommodating thrown debris embodying a superstructure so designed to provide for flow therethrough of air entraining the thrown debris and to pass the air in a manner to insure that the debris is effectively retained in the mobile unit.

Another object of the invention is to provide, in combination with a lawn mower or like equipment, a novel apparatus for disposing of cuttings and other underlying debris.

A further object of the invention is to provide a unique deck structure for the blades of a lawn mower or like equipment.

An additional object of the invention is to provide debris handling apparatus possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings, wherein one but not necessarily the only form of embodiment and application of the invention is shown, FIG. 1 is a side elevation view of a preferred embodiment and application of the invention;

FIG. 2 is a top view of the frame structure embodied in the debris catcher illustrated in FIG. 1;

FIG. 3 is a rear perspective view of the apparatus shown in FIG. 1;

FIG. 4 is a bottom view, in perspective, of the mower portion of the apparatus shown in FIG. 1, highlighting the deck construction;

FIG. 5 is a further perspective view of the aforementioned deck; and

FIG. 6 shows a top view of the deck of FIGS. 4 and 5 with the assembly exploded and debris transmitting conduit offset for clarity of disclosure.

Like parts are indicated by similar characters of reference throughout the several views.

The drawings show the debris transmitting and catching apparatus of the invention in its novel combination with a riding lawn mower. The riding mower 10 may be of any conventional nature embodying one or more rotating cutting blades 11. In general, the mower 10 requires no detailed description as such is not essential to an understanding of the present invention. However features of distinction lie, in this instance, in the particularly incorporated deck 12 which forms a shield for the blades 11 and the utilization of a hitch bracket 13 attached to the rear of the mower chassis.

Noting FIGS. 4 through 6 of the drawings, the deck 12 consists of a top plate portion 14 and a peripherally integrated dependent skirt portion 15. The plate 14 is contoured to produce in its fore portion, referenced to the mower 10, an upwardly sloping relatively displaced arcuate peripheral section 16. This section 16 gradually expands, in a radial sense and gradually increases in depth, in a vertically elevated sense, from a beginning point 16 to one side of the deck to an opening 17 formed at a generally diametrically opposite portion of the deck. The offset of the section 16 thus formed produces, at the underside of plate 14, an ever deepening flow channel 18 terminating at its deepest and widest point in the opening 17 to the top of the deck. Noting FIGS. 1, 5 and 6 of the drawings, the opening 17 is at an angle to a vertical plane, inclining in a sense upwardly and forwardly of the deck. This produces a channel exit directed rearwardly and positioned outwardly of one side of the mower proper.

Integrally connected with the deck plate 14 is a discharge conduit 20 one end of which rims the opening 17. It should be noted that the opening 17 and the cross section of conduit 20 at its attached end is relatively narrow in a direction radially of the deck 12 as compared to an elongation in a sense fore and aft of the deck.

As may be seen in FIG. 1 of the drawings, the conduit decreases in depth as it extends upwardly and inclines rearwardly from the deck. In the example shown the conduit 20 extends to and over the rear right wheel of the riding mower where it provides a terminal discharge section 22 bending to a lesser inclination to a horizontal plane. The discharge section 22 is laterally expanded (see FIG. 6) as compared to the entrance portion of the conduit.

To the rear of the mower 10 is a rectangular cart-like receptacle 30. Rigidly fixed to the underside of the receptacle 30 is a hitch frame 31 including a forwardly projected portion 32. The latter is adapted to releasably connect to the hitch bracket 13 by any suitable conventional means.

The hitch frame 31 is formed of integrally connected rod sections and includes a pair of laterally projected coaxial sections 33 each of which rotatably mounts a wheel 34. Thus the frame 31 together with the two wheels 34 affords a rigidly interconnected undercarriage for the receptacle 30 the purpose of which will be further described.

Mounting to the top of the receptacle 30 is a superstructure including a frame 40 and a frame cover 41 providing a housing 42.

The frame 40 is an open framework also fabricated, in this instance, of rod sections. Its top has a rectangular outline provided by side sections 43 transversely bridged to either end by a section 44 and intermediately thereof by longitudinally spaced sections 45 and 46. The top of the frame overlies the receptacle 30 in elevated spaced relation thereto and projects rearwardly thereof to one end. Interconnecting to the side sections 43 to either end of the rod section 44 most adjacent the mower 10 and the intermediate rod section 45 most adjacent the rear section 44 is a vertically dependent rod section 47. This provides four rod sections 47 which are rectangularly oriented and have their dependent extremities seated in projected ear portions 48 to either side and to either end of the receptacle 30. To effect the seating of the rod sections, the ears may be formed by apertured projections to either side of the receptacle 30 and suitable limit means provided in elevated relation to the dependent extremities of the rods. It is noted that this is only one way for accomplishing the slip fit of the frame to the receptacle. Other equivalent mechanical means for accomplishing the same purpose are equally acceptable. Thus, one enables a stable mount of the frame 40 in overlying relation to the receptacle 30.

The top portion of the framework which projects rearwardly of the main body of the frame is braced by stabilizing rods 49. The rods 49 attach to the rearwardly projected extremities of the rod sections 43 and incline downwardly and forwardly to have their lowermost ends welded or otherwise suitably secured to the adjacent coplanar vertically dependent rod sections 47.

The cover 41, which in this instance is of canvas or suitable plastic material, is fabricated to be rectangular and include a top which overlies the top of the frame and rectangularly interconnected sides which depend peripherally thereof. Due to the rearwardly projected portion of the frame, the rear end of the cover depends to dispose its rear panel 50 in rearwardly spaced relation to the rear end of the receptacle 30. The forwardmost cover panel 51 has a form to produce an outwardly convergent inlet sleeve 52 the projected extremity of which is clamped about the discharge end of the conduit 20.

At the points of juncture with the base rods 49, relatively adjacent and spaced from their top extremities, the rear rod sections 47 are transversely bridged by a rod section 53. Fixed to project forwardly from the rod 53, is a limited platform 54, adjacent and parallel to the top of the frame 40. Covering this platform, connected thereto and extending to drape over the rod 53 and to depend to transversely bridge the space between the underlying portions of the rear rod sections 47, is a panel element 55. The element 55 may be of canvas, plastic or other suitable material affording an impermeable surface as does the cover 41. Its lower end depends in the rear end of the receptacle 30. A further panel 56 of similar material is fixed to depend from the intermediately positioned rod 46 in the top of the frame. The panel 56 is spaced forwardly relative the projected extremity of the platform 54 and its lower extremity lies below the level of such platform.

Thus, interiorly of the cover 41 the housing 42 is transversely bridged by the short depending panel 56 which, as will be further described, acts as a baffle and also by the panel 55 to the rear of the cart which acts as a further baffle.

In the operation of the invention embodiment above described, as the mower 10 is driven over ground surface the rotating cutter blades 11 trim the underlying grass and, under the influence of the centrifugal force produced by the blades, the cuttings and any other underlying debris are lifted to the top interior surface of the deck 12. The contour of the deck utilizes the inherent lifting capacity of the whirling blades. The flow channel 18 affords a directed passage for the cuttings and debris leaving the blade tips, the debris following a naturally induced path to smoothly exit from the deck through the opening 17 to one side and to flow in a direction upwardly and rearwardly of the mower. The exiting of the cuttings in this manner, utilizing the inherently produced forces of the mower mechanism, insures a free and fluid discharge of air entraining the cuttings and debris.

The conduit 20 is so formed to afford an initially accelerated movement of the air entraining the debris including the cuttings. Further its laterally extended and vertically narrowed discharge portion 22 provides that the debris exits to the sleeve 52 in a laterally extended flow pattern. The expanding form of the sleeve 52 then permits the air entraining the debris to further expand in entering the housing portion 42 which forms a flow chamber overlying the receptacle 30 per se.

A portion of the air containing the lighter particles of debris moving rearwardly of the housing 42 adjacent its top encounters the baffle 56. The latter diverts the air and interrupts the entrained debris, impact of air thereon influencing the debris to fall to the bottom of the receptacle 30. This upper air flow which had entrained the lighter debris then follows a devious path about the bottom of baffle 56 to flow to the rear thereof, intermediate the baffle and the platform 54 and outwardly from the receptacle area. This air flows in an accelerated contained fashion between the panel 50 and back of the receptacle 30. As the air at lower levels, containing heavier debris, moves interiorly of the housing 42 to flow from front to rear, the heaviest debris drops to the bottom of the cart under the influence of gravity. The lower levels of air eventually encounter the panel 55 and due to impact, the debris particles remaining therein are caused to reach the receptacle 30 and to drop to its bottom. As air flows to hit the baffle panel 55 there is an inherently produced turbulence, the air eventually flowing upwardly between the platform 54 and baffle 56 to exit in the path as previously described.

The precise air flow characteristics within the housing cannot be described exactly. However, the utilization of baffles as above mentioned creates a circuitous path for the flowing air which enables an optimal extraction of entrained debris. Moreover, the air flow to and from the cart is such to exert a continuing influence on the air and debris leaving the deck 12 and to produce an accelerated flow thereof to the housing 42. As a result thereof the mower operates under minimal load. Thus, not only does the superstructure on the receptacle 30 afford a very effective means for inducing entrained debris to reach the receptacle but the flow patterns are such to inherently aid the mower operation per se.

Another feature of the invention structure is that while the receptacle is being towed by the mower, the rigidity of the interconnection thereof to its undercarriage causes a natural vibrating effect to be reflected from the underlying ground surface to the receptacle body. This produces a constant and inherent spreading of the cuttings and debris in the receptacle and a compaction of the debris to such a degree that a maximal amount of debris may be received and contained in the receptacle during the operation of the mower.

It may thus be seen that the invention provides a unique mobile debris extracting medium that may be attached to a moving device which functions to pick up and fling underlying debris and that this medium functions in an optimal manner. Further, in the described application, the improved deck structure insures that the discharge from the mower blades is smoothly and effectively produced, with the result there is less wear and tear on the mower and more efficient operation of its cutting blades.

It will of course be obvious that the debris catching structure, as well as the deck form illustrated, may be utilized with debris lifting equipment other than lawn mowers. Such is contemplated as within the scope and application of the present invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. Apparatus for catching and storing debris comprising a receptacle, means defining therewith a housing and forming a flow chamber over said receptacle, means defining an inlet to one end of said chamber and an outlet from the opposite end of said chamber, said outlet being defined by a wall extending upward from said receptacle and terminating short of the top of said chamber, said inlet and outlet defining the extremities of an in-line flow path through said chamber in the upper part thereof, means for directing a flow of air entrained debris to and through said inlet to move through said chamber toward said outlet, baffle means disposed transversely of said housing at the opposite end of said chamber and spaced therefrom in line with said outlet, said baffle means being disposed to lie in the path of and to interrupt selective portions of the flow of air entrained debris prior to said outlet, debris which impacts thereon being induced thereby to drop to said receptacle, said baffle means being arranged to limit the direct access to said outlet and to define a circuitous path for the debris free air to seek and escape through said outlet.

2. Apparatus as set forth in claim 1 characterized by said receptacle having an undercarriage rendering it mobile, said undercarriage having a rigid fixed relation to said receptacle of a nature to transmit vibrations occasioned by movement thereof over a ground surface, the vibrations being operative to induce a spreading and compaction of debris on the receptacle bed.

3. Apparatus for catching and storing debris comprising a receptacle, a superstructure forming a housing on said receptacle having an inlet opening to one end and an outlet passage to its other end, means defining a circuitous path for air entering said inlet opening to flow through said housing to said outlet passage, said means including portions effective to induce entrained debris to fall to the bottom of said receptacle, said superstructure including an open framework having an impermeable cover, said impermeable cover overlying said receptacle, generally coextensive therewith, and having an end portion spaced rearwardly of said receptacle to define said outlet passage with the rear end of said receptacle.

4. Apparatus for catching and storing debris comprising a receptacle, a superstructure forming a housing on said receptacle having an inlet opening to one end and an outlet passage to its other end, means defining a circuitous path for air entering said inlet opening to flow through said housing to said outlet passage, said means including portions effective to induce entrained debris to fall to the bottom of said receptacle, said housing consisting of an open framework releasably mounting above and coextensive with said receptacle and including a top portion projected rearwardly of said receptacle and a cover of an impermeable nature draped over said frame to form a housing above said receptacle and include an end portion spaced outwardly from one end to provide said outlet passage, the wall of said cover remote from said one end being defined by an outwardly convergent inlet sleeve adapted for connection to the discharge opening of the deck of a lawn mower or other debris throwing equipment.

5. The structure as set forth in claim 4 wherein means defines a baffle wall transversely bridging said frame to the end of the receptacle remote from said inlet sleeve the top of which is spaced below the top of said frame and further baffle means depend from the top of said frame forwardly thereof, said baffle means functioning on impact thereon of air entraining debris to produce a devious passage of the air through said housing and in the process thereof influence the entrained debris to drop to the bed of the receptacle.

6. Apparatus as set forth in claim 1 including support means rigidly fixed to said receptacle acting as a medium to transmit thereto applied vibration, in which event the debris received in said receptacle will inherently spread and compact.

7. Apparatus for catching and storing debris comprising a receptacle, means defining therewith a housing forming a flow chamber over said receptacle and having an inlet opening thereto and an outlet passage therefrom, said outlet passage including an opening in the upper part of said chamber defined by a wall extending upward in said chamber from said receptacle, means defining a circuitous path for air entering said inlet opening to flow through said housing to said outlet passage, said last mentioned means including baffle portions across the upper part of said chamber in front of and spaced from said outlet opening effective to induce air entrained debris to fall to the bottom of said receptacle, a flexible sleeve rimming said inlet opening, said sleeve being projectable to rim the discharge opening of a powered medium producing a pressured flow of air entraining debris, and the means defining the outlet from said housing being at the end thereof remote from said sleeve and opening to the atmosphere, the form of said housing being such to provide that the movement through said chamber of the air entraining debris is dependent on the power applied thereto prior to entrance thereof to said sleeve.

8. Apparatus for use in cutting and/or lifting and removing debris from lawns or like applications comprising a primary powered unit for operating on material in its path to displace and lift it under the influence of centrifugal force, means for directing said lifted material to disperse it peripherally of said powered unit under the influence of centrifugal force and to guide the so-dispersed material and channel it to clear said operating unit in a relatively straight line path to its rear, means defining a housing for receiving in one end thereof the dispersed material entrained in a pressured flow of air, said housing including means defining a direct line continuation of said path and a receptacle to its bottom, said housing having means defining an outlet in said direct line path providing for a limited channeled flow of air therefrom to the end thereof directly opposite its receiving end and providing for its discharge to the atmosphere and said housing further including therein baffle means in said direct line path in front of and spaced from said outlet for impact thereon of selective portions of air entrained debris moving through said path to cause the entrained debris to be forced thereby to inherently deposit in said receptacle, said baffle means being arranged to per se define the path for flow of air freed of debris in the discharge thereof from said housing.

9. Apparatus for catching and storing debris comprising means defining a housing forming a chamber having an entrance opening to one end and an exit opening to its opposite remote end in an upper part of said housing defined by a wall extending upward from the bottom of said housing and terminating short of the top thereof, said entrance opening having in connection therewith means for directing thereto a pressure flow of air entrained debris, said exit opening being in line with said entrance opening and there being a flow path therebetween to induce an accelerated flow of air entrained debris from said one end of the housing to its opposite end, said flow path being occupied substantially fully by baffle means arranged generally transverse to said flow in the upper part of said chamber for inducing impact thereon of selective portions of the flow of air entrained debris to cause the impacted debris to drop to the bottom of the housing and said baffle means being in advance of and blocking a direct access to said exit, to define thereby a circuitous flow passage for air freed of debris to exit from said housing.

10. Apparatus for use in cutting and/or lifting and removing debris from lawns or like applications comprising a primary powered unit in the form of a riding mower or the like, said unit including a generally horizontally disposed deck plate, blade means centrally supported to rotate adjacent the underside of said deck plate, said plate having a radially displaced portion on its underside at one peripheral location thereon to receive air and entrained debris as a result of rotation of the blade means, said deck plate bing formed with a raised portion defining an arcuate flow channel leading from said displaced portion terminating in a discharge opening at an opposite peripheral location, said discharge opening emerging through said plate to the top thereof and facing rearwardly with an upward inclination, a debris catcher connected to the rear of said unit and having an air outlet in the upper part thereof remote from said unit, and means defining a discharge conduit connected at one end about said discharge opening from said flow channel and extending as an extension thereof upwardly and rearwardly therefrom to clear said unit and have its other end fixed to provide a discharge into said catcher, said catcher having a baffle in the upper part thereof in front of said outlet for interrupting the air entrained debris, air freed of debris flowing around said baffle to said remote outlet.

11. Apparauts for use in cutting and/or lifting and removing debris from a lawn or other ground surface comprising a primary powered unit in the form of a riding mower or the like, said primary powered unit including means for lifting and discharging to the rear thereof debris in an air entrained flow, said primary powered unit including in connection therewith means defining a discharge conduit for directing said flow upwardly and rearwardly, there being a catcher having an inlet opening at one end and defining a longitudinally extended flow path therethrough to an exit opening to its opposite end, said discharge conduit being interconnected to discharge to said catcher through said inlet opening, said catcher including means therein to selectively interrupt portions of the air entrained debris moving through said flow path to induce separation of the debris, and said interrupting means providing thereby a circuitous route out of and back to said flow path for movement of air freed of debris to and through said exit opening of said catcher, said primary powered unit including generally horizontally disposed rotating blade means operative on material in its path, a deck peripherally encompassing said blade means, means defining a rearwardly facing upwardly inclining opening in the top of said deck positioned to one side and adjacent its peripheral edge, means rimming said opening to guide air entrained debris to be channeled from the deck first in a sense upwardly therefrom, in a path to one side, adjacent and clear of said powered unit.

12. Apparatus as set forth in claim 11 characterized by said deck having the form of a cap-like shell the peripheral wall of which depends and surrounds said blade means, an arcuate peripheral portion of the top of the shell being elevated in a sloping manner to produce an ever deepening channel in the under surface thereof leading to said opening, which opening is positioned at a point where the blade means will discharge debris with an optimal component of force and direct the debris to flow in a sense rearwardly of said powered unit to said catcher.

References Cited

UNITED STATES PATENTS

| 2,314,901 | 3/1943 | Scranton | 130—27.5 |
| 2,581,198 | 1/1952 | McPhail | 130—27.5 |
| 3,212,248 | 10/1965 | Leader | 56—202 |
| 3,321,893 | 5/1967 | Leader | 56—202 |
| 3,367,091 | 2/1968 | Weiland | 56—202 |
| 634,042 | 10/1899 | Thurman | 15—353 |
| 2,887,714 | 5/1959 | Hanson | 15—340 |
| 2,955,402 | 10/1960 | Strasel | 56—202 X |
| 3,087,187 | 4/1963 | Hank et al. | 15—340 |
| 3,191,370 | 6/1965 | Epstein | 56—202 |
| 3,300,807 | 1/1967 | Berkowitz | 15—340 |

ANTONIO F. GUIDA, Primary Examiner

U.S. Cl. X.R.

15—353; 56—202